United States Patent
Yang et al.

(10) Patent No.: US 11,445,399 B2
(45) Date of Patent: Sep. 13, 2022

(54) INDICATION METHOD FOR MEASUREMENT RESULT, TERMINAL, AND BASE STATION

(71) Applicant: VIVO MOBILE COMMUNICATION CO., LTD., Guangdong (CN)

(72) Inventors: Xiaodong Yang, Guangdong (CN); Wei Bao, Guangdong (CN); Ran Yue, Guangdong (CN)

(73) Assignee: VIVO MOBILE COMMUNICATION CO., LTD., Guangdong (CN)

( * ) Notice: Subject to any disclaimer, the term of this patent is extended or adjusted under 35 U.S.C. 154(b) by 15 days.

(21) Appl. No.: 17/042,475

(22) Filed: Sep. 28, 2020

(65) Prior Publication Data

US 2021/0029571 A1  Jan. 28, 2021

Related U.S. Application Data

(63) Continuation of application No. PCT/CN2019/078632, filed on Mar. 19, 2019.

(30) Foreign Application Priority Data

Mar. 28, 2018 (CN) .......................... 201810264949.0

(51) Int. Cl.
*H04W 4/00* (2018.01)
*H04W 24/10* (2009.01)
(Continued)

(52) U.S. Cl.
CPC .......... *H04W 24/10* (2013.01); *H04W 24/02* (2013.01); *H04W 48/16* (2013.01)

(58) Field of Classification Search
CPC ...... H04W 24/10; H04W 24/02; H04W 48/16
(Continued)

(56) References Cited

U.S. PATENT DOCUMENTS

2013/0084884 A1  4/2013  Teyeb
2013/0178224 A1  7/2013  Chang et al.
(Continued)

FOREIGN PATENT DOCUMENTS

CN  101635977 A  1/2010
CN  101959230 A  1/2011
(Continued)

OTHER PUBLICATIONS

Discussion and decision document for 3GPP TSG-RAN WG2 Meeting #101, Agenda 9.9.4, Dated from Feb. 26-Mar. 2, 2018, 2 Pages.
(Continued)

*Primary Examiner* — Temica M Beamer
(74) *Attorney, Agent, or Firm* — Brooks Kushman P.C.

(57) ABSTRACT

An indication method for a measurement result, a terminal and a base station are provided. The method includes: performing measurement in a non-connected state to obtain a measurement result; transmitting an uplink message to a base station, the uplink message being at least used to indicate that the measurement result is valid; wherein the uplink message is an uplink message in a connection establishment procedure between the terminal and the base station, or the uplink message is an uplink message transmitted after the connection establishment procedure between the terminal and the base station is completed.

20 Claims, 4 Drawing Sheets

(51) Int. Cl.
*H04W 24/02* (2009.01)
*H04W 48/16* (2009.01)

(58) Field of Classification Search
USPC .......................................................... 370/329
See application file for complete search history.

(56) References Cited

U.S. PATENT DOCUMENTS

| | | | |
|---|---|---|---|
| 2015/0139005 A1 | 5/2015 | Tsuboi et al. | |
| 2018/0049214 A1 | 2/2018 | Kubota et al. | |
| 2019/0104456 A1* | 4/2019 | Kubota | H04W 74/00 |
| 2020/0068550 A1* | 2/2020 | Majmundar | H04W 36/06 |

FOREIGN PATENT DOCUMENTS

| | | |
|---|---|---|
| CN | 102202340 A | 9/2011 |
| CN | 103369587 A | 10/2013 |
| JP | 2013243623 A | 12/2013 |
| KR | 20130086223 A | 7/2013 |

OTHER PUBLICATIONS

Discussion document for 3GPP TSG-RAN WG2 Meeting #101, Agenda 9.9.2, Dated from Feb. 26-Mar. 2, 2018, 2 Pages.
European Search report received from European Patent Office for application No. EP 19775409.6 dated Mar. 28, 2021, 10 Pages.
Second Office Action dated Jan. 6, 2021 issued in Chinese Application No. 201810264949.0.
International Preliminary Report on Patentability dated Oct. 8, 2020 issued in PCT/CN2019/078632.
Discussion and decision document for 3GPP TSG-RAN WG2 Meeting #99b is Dated from Oct. 9-Oct. 13, 2017, 18 Pages.
Notice of Reasons for Refusal for Japanese Patent Application No. 2020-552336 dated Nov. 17, 2021, 3 Pages.
Second Office Action for Japanese Application No. 2020-552336, dated Mar. 29, 2022, 3 Pages.
Third Office Action for Korean Application No. 10-2020-7030967, dated Jun. 21, 2022, 6 Pages.
Huawei et al., "Idle Mode Measurement Reporting Message," 3GPP TSG-RAN WG2 Meeting #101 Agenda Item 9.9.2, Feb. 26-Mar. 2, 2018, R2-1802669, Athens, Greece, 5 Pages.

* cited by examiner

INDICATION METHOD FOR MEASUREMENT RESULT, TERMINAL, AND BASE STATION

CROSS-REFERENCE TO RELATED APPLICATION

The present application is a continuation of PCT Application No. PCT/CN2019/078632 filed on Mar. 19, 2019, which claims a priority to the Chinese patent application No. 201810264949.0 filed in China on Mar. 28, 2018, a disclosure of which is incorporated herein by reference in its entirety.

TECHNICAL FIELD

The present disclosure relates to the field of communication technology, in particular to an indication method for a measurement result, a terminal and a base station.

BACKGROUND

Carrier aggregation technology supports a terminal to establish connection and perform communication through multiple cells and networks, for example, one cell is a primary cell (Primary Cell, PCell), and other cells are secondary cells (Secondary Cells, SCells). The SCell may have an activated state and a deactivated state, while the PCell does not have a deactivated state and instead always remains active. The state of the SCell is configured by the network according to a measurement result reported by the terminal. Conventionally, the terminal performs measurement in the connected state and subsequently performs reporting according to the indication of a base station. In other words, the terminal performs measurement after the radio resource control (Radio Resource Control, RRC) connection establishment is completed, and subsequently performs reporting according to the indication of a base station. Since both the measurement and reporting are performed by the terminal after the RRC connection establishment is completed, the speed of SCell configuration performed by the network is relatively slow, thereby impacting the service performance of the terminal.

SUMMARY

Embodiments of the present disclosure provide an indication method for a measurement result, a terminal and a base station, to solve the problem that the speed of SCell configuration performed by the network is relatively slow, thereby impacting the service performance of the terminal.

To solve the above technical problem, the present disclosure provides an indication method for a measurement result. The method is operable by a terminal and includes: performing measurement in a non-connected state to obtain the measurement result; transmitting an uplink message to a base station, the uplink message being at least used to indicate that the measurement result is valid; wherein the uplink message is an uplink message in a connection establishment procedure between the terminal and the base station, or the uplink message is an uplink message transmitted after the connection establishment procedure between the terminal and the base station is completed.

In a first aspect, an embodiment of the present disclosure further provides an indication method for a measurement result. The method is operable by a terminal and includes: performing measurement in a non-connected state to obtain the measurement result; transmitting an uplink message to a base station, the uplink message being at least used to indicate that the measurement result is valid; wherein the uplink message is an uplink message in a connection establishment procedure between the terminal and the base station, or the uplink message is an uplink message transmitted after the connection establishment procedure between the terminal and the base station is completed.

In a second aspect, an embodiment of the present disclosure provides an indication method for a measurement result. The method is operable by a base station and includes: receiving an uplink message transmitted by a terminal, the uplink message being at least used to indicate that the measurement result is valid; wherein the measurement result is obtained by the terminal by performing measurement in a non-connected state, the uplink message is an uplink message in a connection establishment procedure between the terminal and the base station, or the uplink message is an uplink message transmitted after the connection establishment procedure between the terminal and the base station is completed.

In a third aspect, an embodiment of the present disclosure provides a terminal. The terminal includes: a measurement module, used to perform measurement in a non-connected state to obtain a measurement result; a transmission module, used to transmit an uplink message to a base station, the uplink message being at least used to indicate that the measurement result is valid; wherein the uplink message is an uplink message in a connection establishment procedure between the terminal and the base station, or the uplink message is an uplink message transmitted after the connection establishment procedure between the terminal and the base station is completed.

In a fourth aspect, an embodiment of the present disclosure provides a base station. The base station includes: a first reception module, used to receive an uplink message transmitted by a terminal, the uplink message being at least used to indicate that a measurement result is valid; wherein the measurement result is obtained by the terminal by performing measurement in a non-connected state, the uplink message is an uplink message in a connection establishment procedure between the terminal and the base station, or the uplink message is an uplink message transmitted after the connection establishment procedure between the terminal and the base station is completed.

In a fifth aspect, an embodiment of the present disclosure provides a terminal. The terminal includes a memory, a processor and a computer program stored in the memory and used to be executed by the processor, wherein the processor is used to execute the computer program, to implement steps of the indication method for the measurement result that is operable by a terminal according to an embodiment of the present disclosure.

In a sixth aspect, an embodiment of the present disclosure provides a base station. The base station includes a memory, a processor and a computer program stored in the memory and used to be executed by the processor, wherein the processor is used to execute the computer program, to implement steps of the indication method for the measurement result that is operable by a base station according to an embodiment of the present disclosure.

In a seventh aspect, an embodiment of the present disclosure provides a computer readable storage medium storing therein a computer program, wherein the computer program is used to be executed by a processor to implement steps of the indication method for the measurement result that is operable by a terminal according to an embodiment of the present disclosure, or the computer program is used to be executed by a processor to implement steps of the indication method for the measurement result that is operable by a base station according to an embodiment of the present disclosure.

In this way, in embodiments of the present disclosure, measurements are performed in a non-connected state to obtain a measurement result; an uplink message is transmitted to a base station, the uplink message being at least used to indicate that the measurement result is valid; wherein the uplink message is an uplink message in a connection establishment procedure between the terminal and the base station, or the uplink message is an uplink message transmitted after the connection establishment procedure between the terminal and the base station is completed. Since the measurements are performed in the non-connected state and it is indicated in a connection establishment procedure or after a connection establishment procedure that measurement results are valid, when it is necessary for a network to configure an SCell, the network may rapidly acquire the measurement results from the terminal and configure the SCell, thereby, in comparison with the related art, increasing the SCell configuration speed for the network and improving the service performance of the terminal.

BRIEF DESCRIPTION OF THE DRAWINGS

To better clarify technical solutions of embodiments of the present disclosure, drawings used in description of the embodiments are briefly introduced hereinafter. Apparently, the described drawings merely illustrate a part of the disclosed embodiments. A person ordinary skilled in the art can obtain other drawings based on the described drawings without any creative efforts.

DETAILED DESCRIPTION

The technical solutions in embodiments of the present disclosure are described clearly and completely in conjunction with drawings in the embodiments of the present disclosure hereinafter. Apparently, the described embodiments are merely a part of rather than all the embodiments of the present disclosure. All other embodiments obtained by a person ordinary skilled in the art based on the embodiments of the present disclosure without any creative efforts fall within the scope of the present disclosure.

Figure 1:
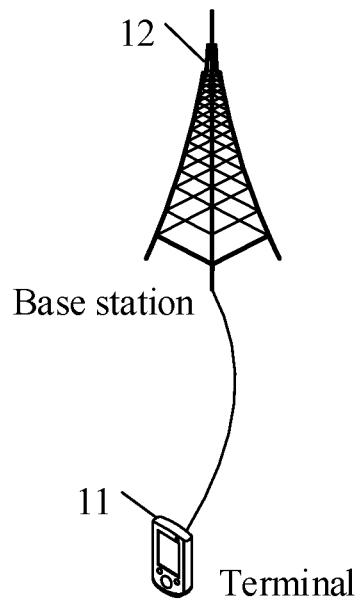
FIG. 1 is a structural diagram of a network system to which embodiments of the present disclosure are applicable.

Referring to FIG. 1, a structural diagram of a network system to which embodiments of the present disclosure are applicable is illustrated. As shown in FIG. 1, the network system includes a terminal 11 and a base station 12. The terminal 11 may be user equipment (User Equipment, UE) or other terminal device, for example, a terminal side device such as a mobile phone, a tablet personal computer, a laptop computer, a personal digital assistant (Personal Digital Assistant, PDA), a mobile internet device (Mobile Internet Device, MID) or a wearable device. It should be noted, a specific type of the terminal 11 is not limited in embodiments of the present disclosure. The terminal 11 may communicate with the base station 12. The base station 12 may be a 5th generation (5th Generation, 5G) or newer base station (e.g., gNB, 5G NR NodeB (NB)), or a base station in another communication system (e.g., a base station in an LTE system), or may be referred to as NodeB, evolved NodeB or other terminology in the field. As long as a same technical effect is achieved, the base station is not limited to a specific technical terminology. It is noted, although a 5G base station is used as an example in embodiments of the present disclosure, a specific type of the base station 12 is not limited thereto.

Figure 2:
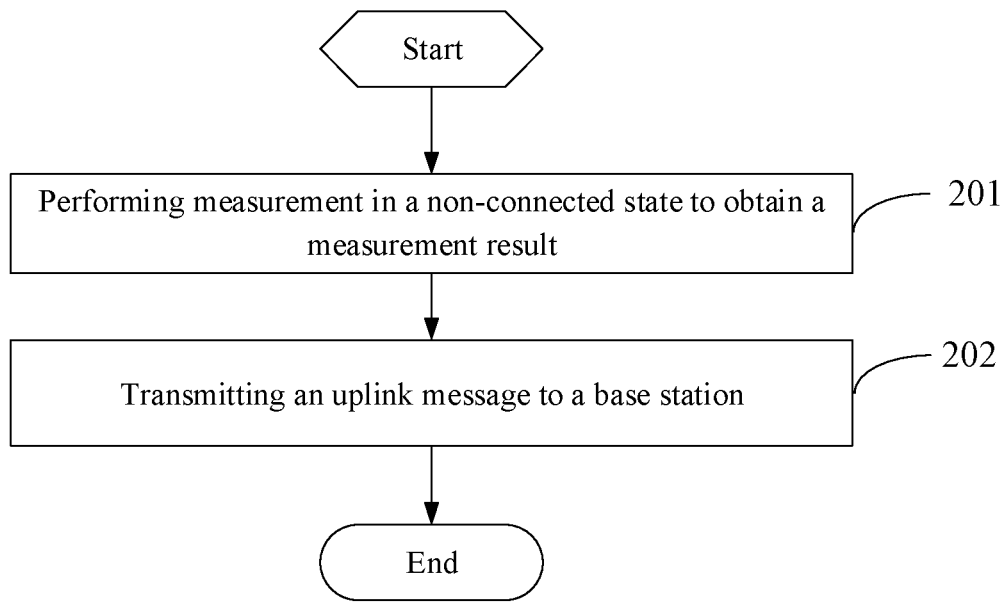
FIG. 2 is a flow diagram of an indication method for a measurement result according to an embodiment of the present disclosure.

Referring to FIG. 2, a flow diagram of an indication method for a measurement result according to an embodiment of the present disclosure is illustrated. As shown in FIG. 2, the method includes the following steps.

A step 201 includes: performing measurement in a non-connected state to obtain a measurement result.

The non-connected state may be a state of a terminal when the terminal is not in a connected state, e.g., an idle state or an inactive state.

The measurement may be performed on one or more frequencies, or may be performed on one or more cells, wherein one or more cells may exist on a single frequency. The measurement result obtained from the measurement may include at least one of: reference signal receiving power (Reference Signal Receiving Power, RSRP), reference signal receiving quality (Reference Signal Receiving Quality, RSRQ), signal to interference plus noise ratio (Signal to Interference plus Noise Ratio, SINR), or the like.

Optionally, a network may issue a measurement configuration to a terminal, and the terminal performs corresponding measurement according to the measurement configuration, so as to improve measurement performance of the terminal. Further, it is noted, the base station which issues the measurement configuration and the base station to which the information that the measurement result is valid is reported by the terminal may be the same base station, or different base stations, which is not limited in embodiments of the present disclosure. Certainly, in embodiments of the present disclosure, the network may alternatively not issue the measurement configuration. In this way, the terminal may perform measurement according to a preset measurement configuration of the terminal or a measurement configuration defined in a protocol.

A step 202 includes: transmitting an uplink message to a base station, the uplink message being at least used to indicate that the measurement result is valid; wherein the uplink message is an uplink message in a connection establishment procedure between the terminal and the base station, or the uplink message is an uplink message transmitted after the connection establishment procedure between the terminal and the base station is completed.

The indicating that the measurement result is valid may be understood as that measurement results are available. Through the indication, the base station may be aware that the terminal currently has available measurement results, and then the base station may acquire the measurement results from the terminal. The uplink message in a connection establishment procedure between the terminal and the base station may be an RRC connection establishment request message in an RRC connection establishment procedure or may be an RRC connection establishment completion message. Since the indication is achieved through the uplink message in a connection establishment procedure between the terminal and the base station, no additional message transmission is required, so that transmission resources are saved and the information that measurement results are valid may be indicated to the base station in time. That the uplink message is transmitted after the connection establishment procedure between the terminal and the base station is completed may include: the uplink message used to indicate that the measurement result is valid is transmitted by the terminal immediately after the connection establishment procedure between the terminal and the base station is completed, or the uplink message used to indicate that the measurement result is valid may be transmitted within a preset time after the connection establishment procedure is completed, or the like.

Through foregoing steps, it may be realized that measurements are performed in a non-connected state and it is indicated in a connection establishment procedure or after a connection establishment procedure that measurement results are valid, thus when it is necessary for a network to configure an SCell, the network may rapidly acquire the measurement results from the terminal and configure the SCell, thereby increasing the SCell configuration speed for the network and improving the service performance of the terminal. Certainly, in embodiments of the present disclosure, the measurement results are not limited to be used for the purpose of SCell configuration, and the network may also use the measurement results to perform other configurations.

It is noted, the foregoing method may be operable by a 5G system or a 4th generation (4th Generation, 4G) system, which is not limited herein. As long as the basically same function may be achieved, the method may be operable by other communication system, e.g., the method may operable by a 6th generation (6th Generation, 6G) system, other communication systems to which the measurement results are applicable, or the like.

In embodiments of the present disclosure, measurements are performed in a non-connected state to obtain a measurement result; an uplink message is transmitted to a base station, the uplink message being at least used to indicate that the measurement result is valid; wherein the uplink message is an uplink message in a connection establishment procedure between the terminal and the base station, or the uplink message is an uplink message transmitted after the connection establishment procedure between the terminal and the base station is completed. Since the measurements are performed in the non-connected state and it is indicated in a connection establishment procedure or after a connection establishment procedure that measurement results are valid, when it is necessary for a network to configure an SCell, the network may rapidly acquire the measurement results from the terminal and configure the SCell, thereby, in comparison with the related art, increasing the SCell configuration speed for the network and improving the service performance of the terminal.

Figure 3:
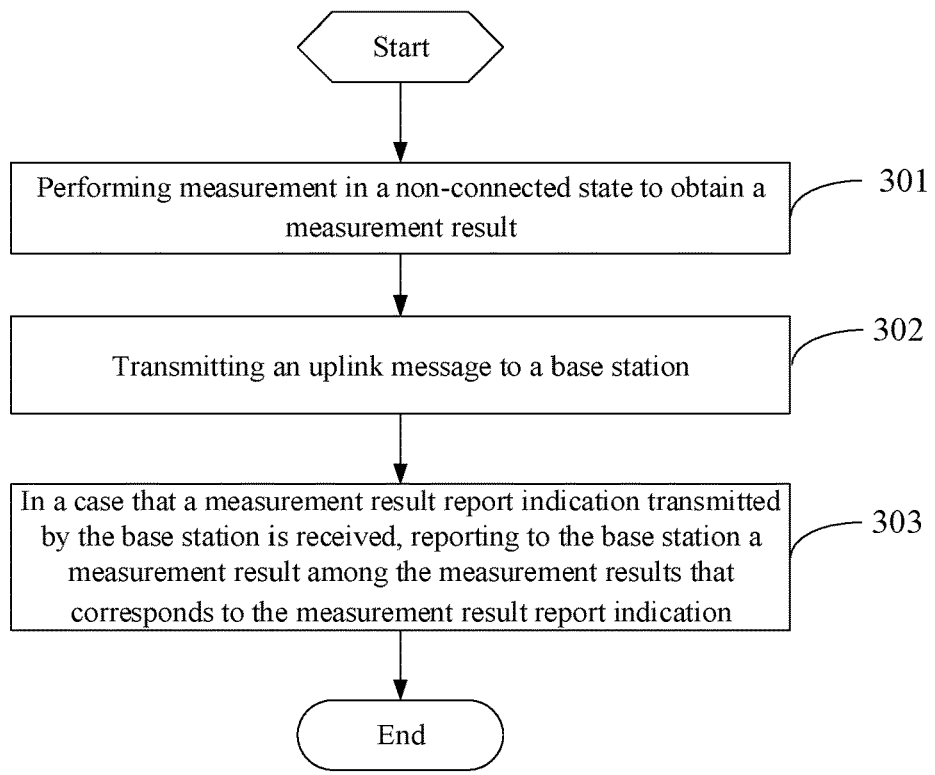
FIG. 3 is another flow diagram of an indication method for a measurement result according to an embodiment of the present disclosure.

Referring to FIG. 3, another flow diagram of an indication method for a measurement result according to an embodiment of the present disclosure is illustrated. As shown in FIG. 3, the method includes the following steps.

A step 301 includes: performing measurement in a non-connected state to obtain a measurement result.

A step 302 includes: transmitting an uplink message to a base station, the uplink message being at least used to indicate that the measurement result is valid; wherein the uplink message is an uplink message in a connection establishment procedure between the terminal and the base station, or the uplink message is an uplink message transmitted after the connection establishment procedure between the terminal and the base station is completed.

A step 303 includes: in a case that a measurement result report indication transmitted by the base station is received, reporting to the base station a measurement result among the measurement results that corresponds to the measurement result report indication.

The step 303 may include: a measurement result that corresponds to the measurement result report indication is reported to the base station only if a measurement result report indication transmitted by the base station is received. The measurement result that corresponds to the measurement result report indication may be a measurement result indicated by the measurement result report indication, a measurement result to which the measurement result report indication corresponds in a certain corresponding relationship, or the like. The reported measurement result may be a part or all of the measurement results obtained in the step 301.

Certainly, if the measurement result report indication is not received by the terminal, the terminal may not report a measure result to the base station.

Through the step 303, it may be realized that, among the measured measurement results, only the measurement result desired by the base station is reported to the base station, so that it may be avoided that when the terminal indicates that the measurement results are valid, the measurement result reported by the terminal according to the indication of the base station is not what the base station needs, so as to achieve the effect of saving transmission resources.

As an optional implementation, the report indication is used to indicate a reporting object; the reporting to the base station the measurement result among the measurement results that corresponds to the measurement result report indication includes: reporting to the base station a measurement result of the reporting object that is included in the measurement result.

The reporting object may refer to objects on which a report by the terminal is required, for example, some frequencies, some cells, some measurement results satisfying certain conditions, or the like.

Further, in the implementation, the reporting to the base station a measurement result of the reporting object that is included in the measurement results may include: in a case that the measurement results measured by the terminal include the measurement result of the reporting object, reporting to the base station the measurement result of the reporting object that is included in the measurement results; and if the terminal does not have the measurement result of the reporting object, not performing the reporting, or indicating to the base station that the terminal does not measure and obtain the measurement result of the reporting object.

It is noted, when the base station indicates multiple reporting objects, if the terminal only has a part of the measurement results of the reporting objects, the terminal may only report the part of the measurement results.

In the implementation, it may be realized that only the measurement result of the reporting object is reported to the base station, thereby further saving transmission resources.

Optionally, the reporting object includes at least one of: at least one frequency, at least one cell or at least one radio access technology; the reporting to the base station the measurement result of the reporting object that is included in the measurement results includes: in a case that the measurement results include the measurement result of the reporting object, reporting to the base station the measurement result of the reporting object.

In the implementation, it may be realized that the base station indicates to the terminal that the measurement result of at least one of a specific frequency and a specific cell is to be reported, thereby further saving transmission resources. For example, after reporting that measurement results are valid, the terminal waits for the base station's request. The base station indicates to the terminal that a frequency 1 and a frequency 2 are to be reported on or a cell 1 and a cell 2 are to be reported on, then according to the indication, the terminal reports the measurement results of the frequency 1 and frequency 2 or the measurement results of the cell 1 and cell 2 if the measurement results involve the indicated frequencies or cells. Certainly, if there are no measurement results involving the indicated frequencies or cells, the terminal does not perform the reporting.

Further, in the implementation, it may be realized that only a measurement result of a specific radio access technology (Radio Access Technology, RAT) is reported, thereby further saving transmission resources. For example, if the reporting object is a new radio (New Radio, NR) RAT, the terminal only needs to report the measurement result of the NR RAT, or if the reporting object is a long term evolution (Long Term Evolution, LTE) RAT, the terminal only needs to report the measurement result of the LTE RAT. Certainly, in embodiments of the present disclosure, the RAT is not limited to the NR RAT and the LTE RAT, and may be other future RATs.

Further, the measurement result report indication may be further used to indicate at least one of: a radio access technology of the at least one frequency, a radio access technology of the at least one cell, a frequency of the at least one radio access technology or a cell of the at least one radio access technology.

Through the contents of the indication, the measurement results to be reported by the terminal may be specified in more detail, so that the terminal may report the measurement results in a more accurate manner. For example, if the base station indicates the frequency 1 and the frequency 2, and indicates that the RAT for the frequency 1 is NR RAT and the RAT for the frequency 2 is LTE RAT, the terminal reports the measurement result of the NR RAT measured on the frequency 1 and the measurement result of the LTE RAT measured on the frequency 2. For another example, if the base station indicates the LTE RAT and the NR RAT, wherein the frequency for the LTE RAT being frequency 1 and the frequency for the NR RAT being frequency 2, the terminal reports the measurement result of the LTE RAT measured on the frequency 1 and the measurement result of the NR RAT measured on the frequency 2.

Optionally, the reporting object includes at least one of: a frequency whose measurement result is top-N ranked, a cell whose measurement result is top-N ranked, a frequency whose measurement result is higher than a specific threshold, or a cell whose measurement result is higher than the specific threshold, wherein N is an integer greater than or equal to 1.

In the implementation, the measurement results are ranked from high to low, for example, ranked in an order from highest measured signal to lowest measured signal.

In the implementation, through the foregoing indication, it may be realized that the terminal only reports to the base station measurement results of N frequencies or N cells with the best measurement results, thereby reporting the most valid measurement results while saving transmission resources. For example, after reporting that measurement results are valid, the terminal waits for the base station's request. The base station indicates to the terminal that two frequencies or two cells with the highest measured signals are to be reported, then according to the indication, the terminal determines that the frequency 1 and frequency 3 are two frequencies with the highest measured signals, or determines that the cell 1 and cell 2 are two cells with the best measured signals, and subsequently, the terminal reports to the base station the measurement results of the frequency 1 and frequency 3, or the measurement results of the cell 1 and cell 2.

Further, in the implementation, it may further be realized that only the measurement result of a frequency or cell whose measurement result is higher than a specific threshold is reported, thereby reporting the most valid measurement results while saving transmission resources. For example, after reporting that measurement results are valid, the terminal waits for the base station's request. The base station indicates to the terminal that a frequency or cell whose measurement signal result is higher than X is to be reported, and then according to the indication, the terminal reports, if there is a frequency or cell whose measurement result is higher than X, the measurement result of the corresponding frequency and cell. It is noted, the specific threshold may be preset, e.g., pre-negotiated by the base station and the terminal, predefined in a protocol, or the like. Certainly, the specific threshold may be configured by the base station through the foregoing report indication. For example, the report indication includes the specific threshold value.

Further, considering that multiple cells may exist on each of certain frequencies, the frequency whose measurement result is top-N ranked includes: a frequency top-N ranked according to an average value for each frequency, wherein the average value for each frequency is an average value of measurement results of M cells on the frequency, the M cells are cells on the frequency whose measurement results are top-M ranked, and M is an integer greater than or equal to 1; or, a frequency top-N ranked according to a measurement result of a cell whose measurement result is the best for each frequency.

The M may be pre-configured, or included in the report indication, which is not limited. In this way, it may be realized that the foregoing N frequencies are determined by making comparison according to the average value of best N cells on a frequency or according to the best cell on a frequency. Since the M cells are cells on the frequency whose measurement results are top-M ranked, or the ranking is performed based on the measurement result of a cell whose measurement result is the best for each frequency, the N frequencies thus determined are more beneficial to the SCell configuration by the network, thereby improving the SCell configuration performance of the network.

As an optional implementation, the uplink message is further used to indicate at least one of: a frequency corresponding to the measurement result, a cell corresponding to the measurement result, a measurement value of the measurement result, or a radio access technology corresponding to the measurement result; wherein the measurement value includes at least one of: a maximum value or a minimum value of the measurement results.

In the implementation, it may be realized that the foregoing contents are indicated in the uplink message, thus after receiving the uplink message, the base station may be aware of the contents included in the valid measurement results of the terminal, thereby determining, according to these contents, whether measurement results needed by the base station exist in the valid measurement results of the terminal. If so, the base station may transmit a measurement result report indication to the terminal, so that the terminal reports the valid measurement results to the base station. Certainly, the report indication may not indicate a reporting object, and the terminal may report directly all the measurement results obtained in the step 301. Since the measurement results of the terminal include a measurement result needed by the base station, a waste of transmission resources is avoided. Certainly, the implementation may further be combined with the foregoing implementation of reporting object, thereby saving the transmission resources even further.

Further, in the implementation, if the base station determines according to the foregoing contents that the measurement results of the terminal do not include a measurement result needed by the base station, the base station may no transmit the measurement result report indication to the terminal. In other words, in the implementation, the base station may determine, according to the contents indicated by the uplink message, whether to transmit the measurement result report indication to the terminal.

In this embodiment, multiple optional implementations are added on the basis of the embodiment as shown in FIG. 2, and all of the implementations may improve the speed of SCell configuration performed by the network, so as to improve the service performance of the terminal and further achieve beneficial effects such as saving transmission resources.

Figure 4:
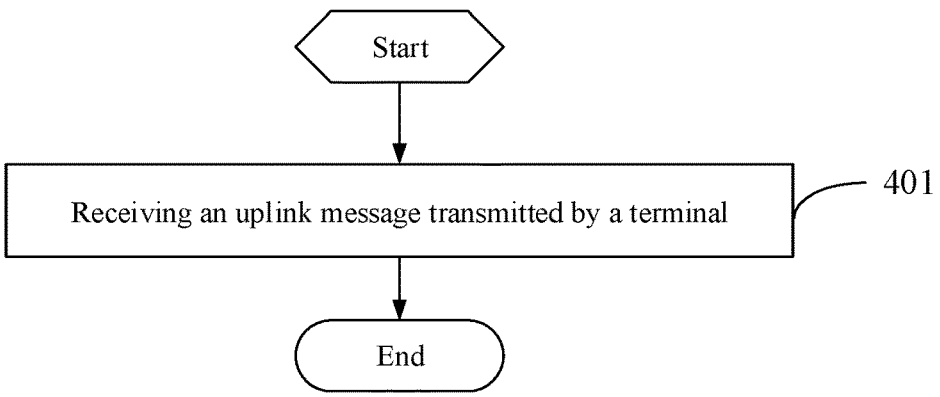
FIG. 4 is yet another flow diagram of an indication method for a measurement result according to an embodiment of the present disclosure.

Referring to FIG. 4, a flow diagram of an indication method for a measurement result according to an embodiment of the present disclosure is illustrated. The method is operable by a base station, and as shown in FIG. 4, includes the following steps.

A step 401 includes: receiving an uplink message transmitted by a terminal, the uplink message being at least used to indicate that a measurement result is valid; wherein the measurement result is obtained by the terminal by performing measurement in a non-connected state, the uplink message is an uplink message in a connection establishment procedure between the terminal and the base station, or the uplink message is an uplink message transmitted after the connection establishment procedure between the terminal and the base station is completed.

Optionally, after the receiving the uplink message transmitted by the terminal, the method further includes: transmitting a measurement result report indication to the terminal; receiving a measurement result among the measurement results that is reported by the terminal and corresponds to the measurement result report indication.

Optionally, the measurement result report indication is used to indicate a reporting object; the receiving the measurement result among the measurement results that is reported by the terminal and corresponds to the measurement result report indication includes: receiving a measurement result of the reporting object that is reported by the terminal and included in the measurement results.

Optionally, the reporting object includes at least one of: at least one frequency, at least one cell or at least one radio access technology; the receiving the measurement result of the reporting object that is reported by the terminal and included in the measurement results includes: in a case that the measurement results include the measurement result of the reporting object, receiving the measurement result of the reporting object reported by the terminal.

Optionally, the measurement result report indication is further used to indicate at least one of: a radio access technology of the at least one frequency, a radio access technology of the at least one cell, a frequency of the at least one radio access technology or a cell of the at least one radio access technology.

Optionally, the reporting object includes at least one of: a frequency whose measurement result is top-N ranked, a cell whose measurement result is top-N ranked, a frequency whose measurement result is higher than a specific threshold, or a cell whose measurement result is higher than the specific threshold, wherein N is an integer greater than or equal to 1.

Optionally, the frequency whose measurement result is top-N ranked includes: a frequency top-N ranked according to an average value for each frequency, wherein the average value for each frequency is an average value of measurement results of M cells on the frequency, the M cells are cells on the frequency whose measurement results are top-M ranked, and M is an integer greater than or equal to 1; or, a frequency top-N ranked according to a measurement result of a cell whose measurement result is the best for each frequency.

Optionally, the uplink message is further used to indicate at least one of: a frequency corresponding to the measurement result, a cell corresponding to the measurement result, a measurement value of the measurement result, or a radio access technology corresponding to the measurement result; the measurement value includes at least one of: a maximum value or a minimum value of the measurement results; wherein the base station determines whether to transmit the measurement result report indication to the terminal according to contents indicated by the uplink message.

It is noted, this embodiment is an implementation of base station corresponding to the embodiments as shown in FIG. 2 and FIG. 3. For a specific implementation of the base station, references may be made to the related description of the embodiment as show in FIG. 3 and the same beneficial effects may be achieved. To avoid repeated description, a detailed description thereof is omitted herein.

Figure 5:
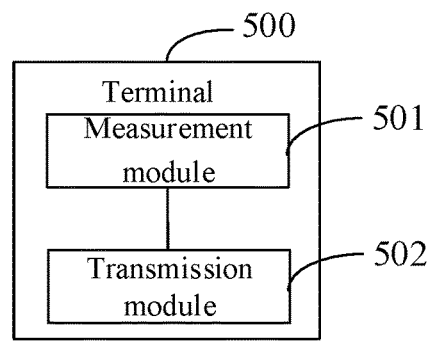
FIG. 5 is a structural diagram of a terminal according to an embodiment of the present disclosure.
Figure 6:
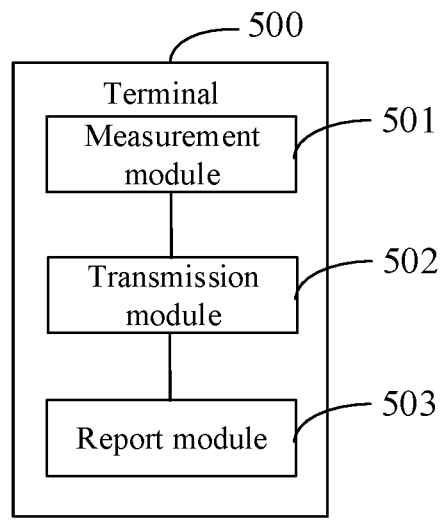
FIG. 6 is another structural diagram of a terminal according to an embodiment of the present disclosure.

Referring to FIG. 5, a structural diagram of a terminal according to an embodiment of the present disclosure is illustrated. As shown in FIG. 5, a terminal 500 includes: a measurement module 501, used to perform measurement in a non-connected state to obtain a measurement result; a transmission module 502, used to transmit an uplink message to a base station, the uplink message being at least used to indicate that the measurement result is valid; wherein the uplink message is an uplink message in a connection establishment procedure between the terminal and the base station, or the uplink message is an uplink message transmitted after the connection establishment procedure between the terminal and the base station is completed.

Optionally, as shown in FIG. 5, the terminal 500 further includes: a report module 503, used to, in a case that a measurement result report indication transmitted by the base station is received, report to the base station a measurement result among the measurement results that corresponds to the measurement result report indication.

Optionally, the measurement result report indication is used to indicate a reporting object; the report module 503 is used to report to the base station a measurement result of the reporting object that is included in the measurement results.

Optionally, the reporting object includes at least one of: at least one frequency, at least one cell or at least one radio access technology; the report module 503 is used to, in a case that the measurement results include the measurement result of the reporting object, report to the base station the measurement result of the reporting object.

Optionally, the measurement result report indication is further used to indicate at least one of: a radio access technology of the at least one frequency, a radio access technology of the at least one cell, a frequency of the at least one radio access technology or a cell of the at least one radio access technology.

Optionally, the reporting object includes at least one of: a frequency whose measurement result is top-N ranked, a cell whose measurement result is top-N ranked, a frequency whose measurement result is higher than a specific threshold, or a cell whose measurement result is higher than the specific threshold, wherein N is an integer greater than or equal to 1.

Optionally, the frequency whose measurement result is top-N ranked includes: a frequency top-N ranked according to an average value for each frequency, wherein the average value for each frequency is an average value of measurement results of M cells on the frequency, the M cells are cells on the frequency whose measurement results are top-M ranked, and M is an integer greater than or equal to 1; or, a frequency top-N ranked according to a measurement result of a cell whose measurement result is the best for each frequency.

Optionally, the uplink message is further used to indicate at least one of: a frequency corresponding to the measurement result, a cell corresponding to the measurement result, a measurement value of the measurement result, or a radio access technology corresponding to the measurement result; wherein the measurement value includes at least one of: a maximum value or a minimum value of the measurement results.

The terminal according to the embodiment of the present disclosure may implement various processes implemented by the terminal in the method embodiments of FIG. 2 and FIG. 3, to avoid repeated description, a detailed description thereof is omitted herein, which may improve the speed of SCell configuration performed by the network, so as to improve the service performance of the terminal.

Figure 7:
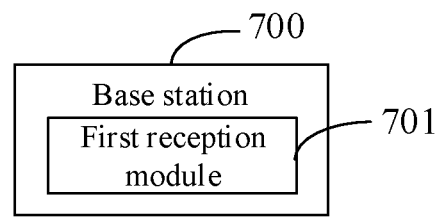
FIG. 7 is a structural diagram of a base station according to an embodiment of the present disclosure.
Figure 8:
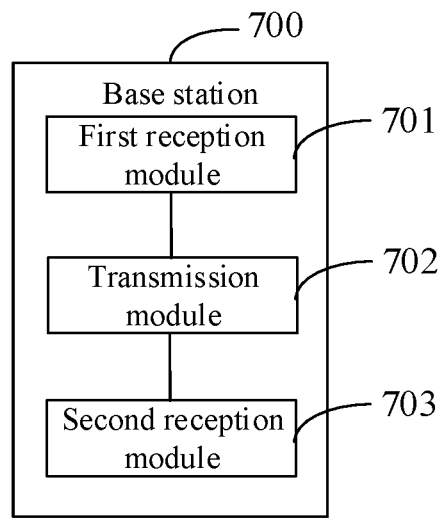
FIG. 8 is another structural diagram of a base station according to an embodiment of the present disclosure.

Referring to FIG. 7, a structural diagram of a base station according to an embodiment of the present disclosure is illustrated. As shown in FIG. 8, a base station 700 includes: a first reception module 701, used to receive an uplink message transmitted by a terminal, the uplink message being at least used to indicate that a measurement result is valid; wherein the measurement result is obtained by the terminal by performing measurement in a non-connected state, the uplink message is an uplink message in a connection establishment procedure between the terminal and the base station, or the uplink message is an uplink message transmitted after the connection establishment procedure between the terminal and the base station is completed.

Optionally, as shown in FIG. 8, the base station 700 further includes: a transmission module 702, used to transmit a measurement result report indication to the terminal; a second reception module 703, used to receive a measurement result among the measurement results that is reported by the terminal and corresponds to the measurement result report indication.

Optionally, the measurement result report indication is used to indicate a reporting object; the second reception module 703 is used to receive a measurement result of the reporting object that is reported by the terminal and included in the measurement results.

Optionally, the reporting object includes at least one of: at least one frequency, at least one cell or at least one radio access technology; the second reception module is used to, in a case that the measurement results include the measurement result of the reporting object, receive the measurement result of the reporting object reported by the terminal.

Optionally, the measurement result report indication is further used to indicate at least one of: a radio access technology of the at least one frequency, a radio access technology of the at least one cell, a frequency of the at least one radio access technology or a cell of the at least one radio access technology.

Optionally, the reporting object includes at least one of: a frequency whose measurement result is top-N ranked, a cell whose measurement result is top-N ranked, a frequency whose measurement result is higher than a specific threshold, or a cell whose measurement result is higher than the specific threshold, wherein N is an integer greater than or equal to 1.

Optionally, the frequency whose measurement result is top-N ranked includes: a frequency top-N ranked according to an average value for each frequency, wherein the average value for each frequency is an average value of measurement results of M cells on the frequency, the M cells are cells on the frequency whose measurement results are top-M ranked, and M is an integer greater than or equal to 1; or, a frequency top-N ranked according to a measurement result of a cell whose measurement result is the best for each frequency.

Optionally, the uplink message is further used to indicate at least one of: a frequency corresponding to the measurement result, a cell corresponding to the measurement result, a measurement value of the measurement result, or a radio access technology corresponding to the measurement result; the measurement value includes at least one of: a maximum value or a minimum value of the measurement results; wherein the base station determines whether to transmit the measurement result report indication to the terminal according to contents indicated by the uplink message.

The base station according to the embodiment of the present disclosure may implement various processes implemented by the base station in the method embodiment of FIG. 4, to avoid repeated description, a detailed description thereof is omitted herein, which may improve the speed of SCell configuration performed by the network, so as to improve the service performance of the terminal.

Figure 9:
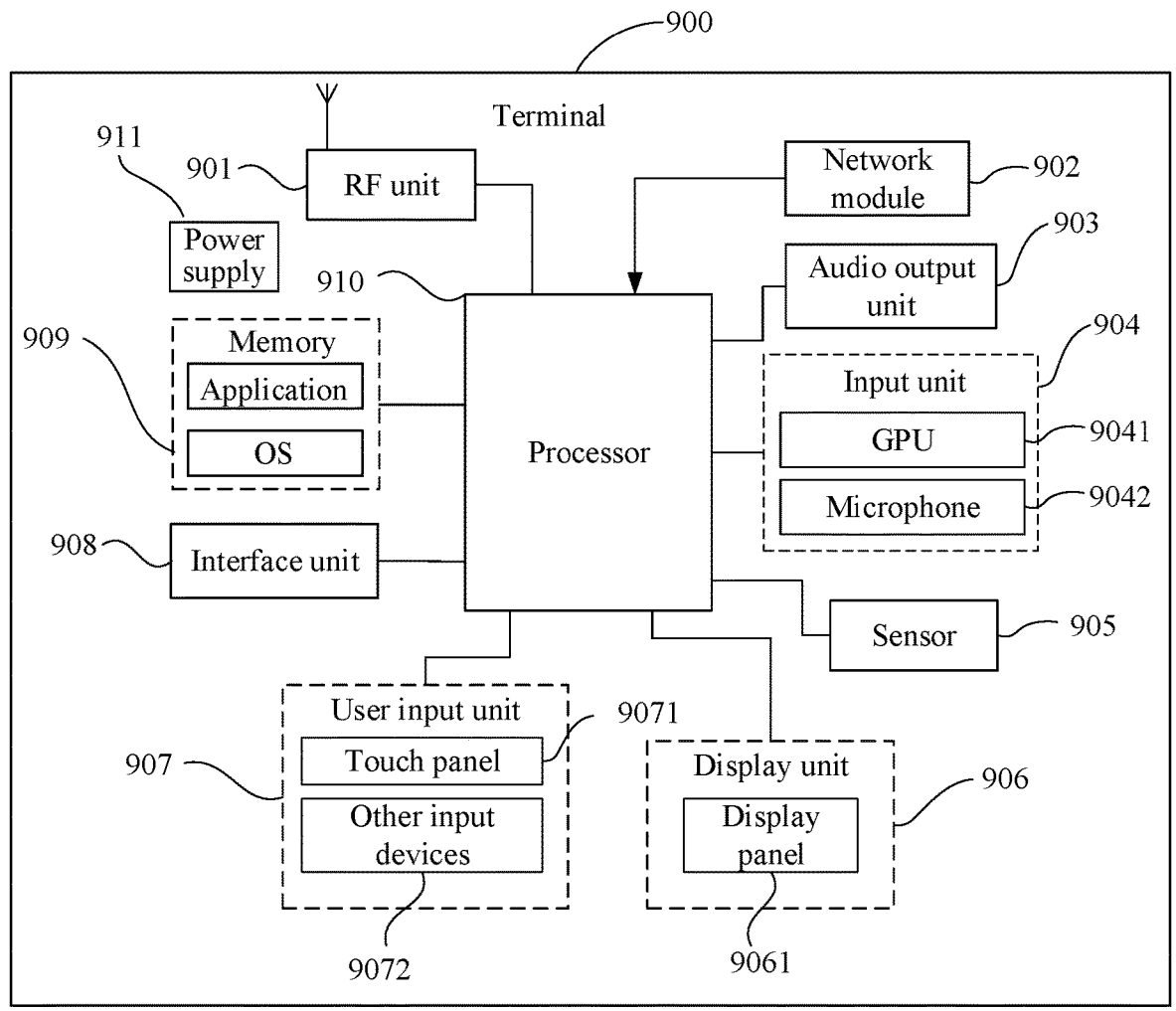
FIG. 9 is yet another structural diagram of a terminal according to an embodiment of the present disclosure.

FIG. 9 is a schematic hardware structure diagram of a terminal implementing various embodiments of the present disclosure.

The terminal 900 includes, but is not limited to: a radio frequency (Radio Frequency, RF) unit 901, a network module 902, an audio output unit 903, an input unit 904, a sensor 905, a display unit 906, a user input unit 907, an interface unit 908, a memory 909, a processor 910, a power supply 911 and the like. It is appreciated by a person skilled in the art, the terminal structure as shown in FIG. 9 does not constitute a limitation on the terminal. The terminal may include more or less components than those as shown, or some components may be combined, or the components may have a different layout. In embodiments of the present disclosure, the terminal includes, but is not limited to: a mobile phone, a tablet computer, a notebook computer, a palmtop computer, an in-vehicle terminal, a wearable device, a pedometer and the like.

The RF unit 901 is used to perform measurement in a non-connected state to obtain a measurement result; transmit an uplink message to a base station, the uplink message being at least used to indicate that the measurement result is valid; wherein the uplink message is an uplink message in a connection establishment procedure between the terminal and the base station, or the uplink message is an uplink message transmitted after the connection establishment procedure between the terminal and the base station is completed.

Optionally, after the transmitting the uplink message to the base station, the RF unit 901 is further used to: in a case that a measurement result report indication transmitted by the base station is received, report to the base station a measurement result among the measurement results that corresponds to the measurement result report indication.

Optionally, the measurement result report indication is used to indicate a reporting object; the reporting, performed by the RF unit 901, to the base station the measurement result among the measurement results that corresponds to the measurement result report indication includes: reporting to the base station a measurement result of the reporting object that is included in the measurement results.

Optionally, the reporting object includes at least one of: at least one frequency, at least one cell or at least one radio access technology; the reporting, performed by the RF unit 901, to the base station the measurement result of the reporting object that is included in the measurement results includes: in a case that the measurement results include the measurement result of the reporting object, reporting to the base station the measurement result of the reporting object.

Optionally, the measurement result report indication is further used to indicate at least one of: a radio access technology of the at least one frequency, a radio access technology of the at least one cell, a frequency of the at least one radio access technology or a cell of the at least one radio access technology.

Optionally, the reporting object includes at least one of: a frequency whose measurement result is top-N ranked, a cell whose measurement result is top-N ranked, a frequency whose measurement result is higher than a specific threshold, or a cell whose measurement result is higher than the specific threshold, wherein N is an integer greater than or equal to 1.

Optionally, the frequency whose measurement result is top-N ranked includes: a frequency top-N ranked according to an average value for each frequency, wherein the average value for each frequency is an average value of measurement results of M cells on the frequency, the M cells are cells on the frequency whose measurement results are top-M ranked, and M is an integer greater than or equal to 1; or, a frequency top-N ranked according to a measurement result of a cell whose measurement result is the best for each frequency.

Optionally, the uplink message is further used to indicate at least one of: a frequency corresponding to the measurement result, a cell corresponding to the measurement result, a measurement value of the measurement result, or a radio access technology corresponding to the measurement result; wherein the measurement value includes at least one of: a maximum value or a minimum value of the measurement results.

The terminal may improve the speed of SCell configuration performed by the network, so as to improve the service performance of the terminal.

It is understood, in embodiments of the present disclosure, the RF unit 901 may be used to receive and transmit signals during information transmission or during a call. Specifically, the RF unit 901 receives downlink data from a base station and transfers the data to the processor 910 for processing; and the RF unit 901 transmits uplink data to the base station. Generally, the RF unit 901 includes, but is not limited to: an antenna, at least one amplifier, a transceiver, a coupler, a low noise amplifier, a duplexer and the like. In addition, the RF unit 901 may be used to communicate with a network or other device through a wireless communication system.

By means of the network module 902, the terminal provides user with wireless broadband Internet access, such as sending and receiving emails, browsing webpages and accessing streamed media.

The audio output unit 903 may convert audio data received by the RF unit 901 or network module 902 or stored in the memory 909 into audio signals and output audibly. Moreover, the audio output unit 903 may provide audio outputs associated with the specific functions performed by the terminal 900 (such as, incoming call ringtone, message received ringtone). The audio output unit 903 includes a speaker, a buzzer, a telephone receiver and the like.

The input unit 904 is used to receive audio or video signals. The input unit 904 may include a graphics processing unit (Graphics Processing Unit, GPU) 9041 and a microphone 9042. The GPU 9041 processes image data such as still picture or video acquired by an image capture device (e.g., a camera) in a video capture mode or image capture mode. The processed image frames may be displayed on the display unit 906. The image frames processed by the GPU 9041 may be stored in the memory 909 (or other storage medium) or sent via the RF unit 901 or network module 902. The microphone 9042 may pick up sound and convert it into audio data. In a phone call mode, the processed audio data may be converted into a format suitable for transmission to a mobile communication base station via the RF unit 901 and output.

The terminal 900 further includes at least one sensor 905, for example, an optical sensor, a motion sensor, among others. In specific, the optical sensor includes ambient light sensor and proximity sensor. The ambient light sensor may adjust a brightness of a display panel 9061 according to the ambient light conditions. The proximity sensor may deactivate the display panel 9061 and/or a backlight when the terminal 900 is moved close to an ear. As a kind of motion sensor, an acceleration sensor may detect a magnitude of acceleration on each direction (generally, on three axes). While remaining still, the acceleration sensor may detect the magnitude and direction of gravity, which may be used in posture identification of the terminal (e.g., switch between portrait and landscape modes, related games, magnetometer posture calibration), vibration identification related function (e.g., pedometer, knock) and the like; the sensor 905 may further include a fingerprint sensor, a pressure sensor, an iris sensor, a molecule sensor, a gyroscope, a barometer, a hygrometer, a thermometer, an infrared sensor and the like, which is not described in detail herein.

The display unit 906 is used to display information input by or presented to a user. The display unit 906 may include a display panel 9061. The display panel 9061 may be constructed in form of liquid crystal display (Liquid Crystal Display, LCD), organic light-emitting diode (Organic Light-Emitting Diode, OLED) and the like.

The user input unit 907 may be used to receive input numerical information or character information, and generate key signal inputs related to the user setting and function control of the terminal. In specific, the user input unit 907 includes a touch panel 9071 and other input devices 9072. The touch panel 9071, also known as touch screen, may detect the touch operations thereon or in the vicinity thereof performed by the user (such as touch operations performed on or in the vicinity of the touch panel 9071 by the user using a finger, stylus or any other suitable object or accessory). The touch panel 9071 may include a touch detector and a touch controller. Wherein, the touch detector detects the position where the user touched and the signal resulting from the touch operation, and conveys the signal to the touch controller; the touch controller receives the touch information from the touch detector, converts the information into coordinates of the touch and conveys the coordinates to the processor 910, as well as receives and executes the commands from the processor 910. Further, the touch panel 9071 may be implemented in a variety of modes, such as resistance, capacitance, infrared and surface acoustic wave. In addition to the touch panel 9071, the user input unit 907 may include other input devices 9072. In specific, the other input devices 9072 may include, but is not limited to: physical keyboard, functional keys (such as volume button, switch button, etc.), track ball, mouse, joystick, which is not described in detail herein.

Further, the touch panel 9071 may overlie the display panel 9061. Having detected a touch operation thereon or in the vicinity thereof, the touch panel 9071 conveys the detected touch signal to the processor 910 to categorize the touch event, and the processor 910 provides corresponding visual output on the display panel 9061 in accordance with the category of the touch event. Although, in FIG. 9, the touch panel 9071 and the display panel 9061 are provided as two separate parts to implement the input and output function of the terminal, the touch panel 9071 and the display panel 9061 may be integrated to implement the input and output function of the terminal in some embodiments, which is not limited herein.

The interface unit 908 is an interface by which an external device is connected to the terminal 900. For example, the external device may include a wired or wireless headset port, an external power supply (or battery charger) port, a wired or wireless data port, a storage card port, a port used to be connected to a device having an identification module, an audio input/output (Input/Output, I/O) port, a video I/O port, an earphone port and the like. The interface unit 908 may be used to receive input (e.g., data information, power, etc.) from the external device and transfer the received input to one or more components in the terminal 900, or may be used to transmit data between the terminal 900 and the external device.

The memory 909 may be used to store software program and other data. The memory 909 may include generally a program storage area and a data storage area. The program storage area may store an operating system (Operating System, OS), an application required for at least one function (such as an audio playing function and an image playback function) and the like; the data storage area may store data (e.g., audio data, phone book, etc.) created according to usage of a mobile phone, and the like. Moreover, the memory 909 may include a high speed random access memory, as well as a non-volatile storage, such as at least one disk storage device, flash memory or other volatile solid-state storage devices.

The processor 910 is a control center of the terminal. The processor 910 is connected to various parts of the entire terminal through various interfaces and lines, and performs various functions of the terminal and processes data by executing or running software programs and/or modules stored in the memory 909 and invoking data stored in the memory 909, so as to achieve an overall monitoring of the terminal. The processor 910 may include one or more processing units; optionally, the processor 910 may integrate an application processor and a modem, wherein the application processor is mainly responsible for executing an operating system, a user interface, an application, etc., while the modem is mainly responsible for handling wireless communication. It is understood, the modem may be not integrated in the processor 910.

The terminal 900 may further include a power supply 911 (e.g., a battery) providing power to various components. Optionally, the power supply 911 may be logically connected to the processor 910 via a power management system, such that functions such as charging management, discharging management and power management may be achieved through the power management system.

Further, the terminal 900 includes some functional modules not shown in the figure, which are not described herein.

Optionally, an embodiment of the present disclosure further provides a terminal, including a processor 910, a memory 909, a computer program stored in the memory 909 and used to be executed by the processor 910, wherein the processor 910 is used to execute the computer program to implement various processes of the embodiments of the foregoing indication method for a measurement result, and may achieve the same technical effects. To avoid repeated description, a detailed description thereof is omitted herein.

Figure 10:
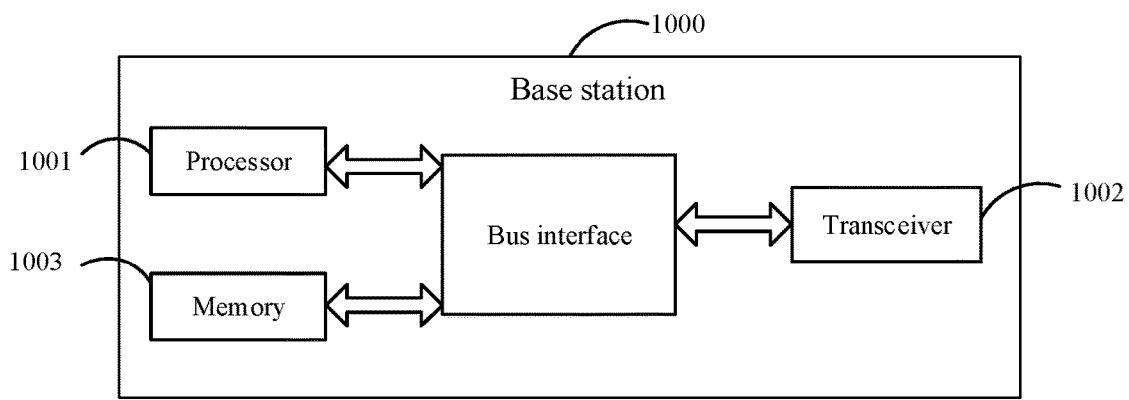
FIG. 10 is yet another structural diagram of a base station according to an embodiment of the present disclosure.

Referring to FIG. 10, another structural diagram of a base station according to an embodiment of the present disclosure is illustrated. As shown in FIG. 10, a base station 1000 includes: a processor 1001, a transceiver 1002, a memory 1003 and a bus interface.

The transceiver 1002 is used to receive an uplink message transmitted by a terminal, the uplink message being at least used to indicate that a measurement result is valid; wherein the measurement result is obtained by the terminal by performing measurement in a non-connected state, the uplink message is an uplink message in a connection establishment procedure between the terminal and the base station, or the uplink message is an uplink message transmitted after the connection establishment procedure between the terminal and the base station is completed.

Optionally, after the receiving the uplink message transmitted by the terminal, the transceiver 1002 is further used to: transmit a measurement result report indication to the terminal; receive a measurement result among the measurement results that is reported by the terminal and corresponds to the measurement result report indication.

Optionally, the measurement result report indication is used to indicate a reporting object; the receiving, performed by the transceiver 1002, the measurement result among the measurement results that is reported by the terminal and corresponds to the measurement result report indication includes: receiving a measurement result of the reporting object that is reported by the terminal and included in the measurement results.

Optionally, the reporting object includes at least one of: at least one frequency, at least one cell or at least one radio access technology; the receiving, performed by the transceiver 1002, the measurement result of the reporting object that is reported by the terminal and included in the measurement results includes: in a case that the measurement results include the measurement result of the reporting object, receiving the measurement result of the reporting object reported by the terminal.

Optionally, the measurement result report indication is further used to indicate at least one of: a radio access technology of the at least one frequency, a radio access technology of the at least one cell, a frequency of the at least one radio access technology or a cell of the at least one radio access technology.

Optionally, the reporting object includes at least one of: a frequency whose measurement result is top-N ranked, a cell whose measurement result is top-N ranked, a frequency whose measurement result is higher than a specific threshold, or a cell whose measurement result is higher than the specific threshold, wherein N is an integer greater than or equal to 1.

Optionally, the frequency whose measurement result is top-N ranked includes: a frequency top-N ranked according to an average value for each frequency, wherein the average value for each frequency is an average value of measurement results of M cells on the frequency, the M cells are cells on the frequency whose measurement results are top-M ranked, and M is an integer greater than or equal to 1; or, a frequency top-N ranked according to a measurement result of a cell whose measurement result is the best for each frequency.

Optionally, the uplink message is further used to indicate at least one of: a frequency corresponding to the measurement result, a cell corresponding to the measurement result, a measurement value of the measurement result, or a radio access technology corresponding to the measurement result; the measurement value includes at least one of: a maximum value or a minimum value of the measurement results; wherein the base station determines whether to transmit the measurement result report indication to the terminal according to contents indicated by the uplink message.

The base station may improve the speed of SCell configuration performed by the network, so as to improve the service performance of the terminal.

The transceiver 1002 is used to receive and transmit data under the control of the processor 1001, and the transceiver 1002 includes at least two antenna ports.

In FIG. 10, a bus architecture may include any quantity of interconnected buses and bridges, and connects various circuits including one or more processors represented by the processor 1001 and memory represented by the memory 1003. The bus architecture may also connect various other circuits such as peripherals, voltage regulators and power management circuits, which is well known in the art. Therefore, a detailed description thereof is omitted herein. A bus interface provides an interface. The transceiver 1002 may be multiple elements, such as a transmitter and a receiver, to allow for communication with various other apparatuses on the transmission medium. For different user equipment, the user interface 1004 may be an interface capable of connect a desired device externally or internally. The connected device includes, but is not limited to: a keypad, a display, a loudspeaker, a microphone, a joystick, and the like.

The processor 1001 is responsible for supervising the bus architecture and normal operation and the memory 1003 may store the data being used by the processor 1001 during operation.

Optionally, an embodiment of the present disclosure further provides a base station, including a processor 1001, a memory 1003, a computer program stored in the memory 1003 and used to be executed by the processor 1001, wherein the processor 1001 is used to execute the computer program to implement various processes of the embodiments of the foregoing indication method for a measurement result, and may achieve the same technical effects. To avoid repeated description, a detailed description thereof is omitted herein.

An embodiment of the present disclosure further provides a computer readable storage medium storing therein a computer program, wherein the computer program is used to be executed by a processor to implement various processes of the embodiments of the indication method for a measurement result operable by a terminal according to an embodiment of the present disclosure, or the computer program is used to be executed by a processor to implement various processes of the embodiments of the indication method for a measurement result operable by a base station according to an embodiment of the present disclosure, and may achieve the same technical effects. To avoid repeated description, a detailed description thereof is omitted herein. The computer readable storage medium includes a read-only memory (Read-Only Memory, ROM), a random access memory (Random Access Memory, RAM), a magnetic disk, an optic disc or the like.

It should be noted that the terms "include", "have", or any variation thereof used herein are intended to cover a non-exclusive inclusion, such that a process, a method, an article, or a device that includes a list of elements not only includes the list of elements, but also may include other elements not expressly listed or include elements inherent to the process, the method, the article, or the device. In case that there is no further limitation, an element preceded by "includes or including" does not preclude existence of additional identical elements in the process, the method, the article, or the device including the element.

From the foregoing description of the embodiments, a person skilled in the art will clearly appreciate that the method according to the embodiments may be implemented not only by software in conjunction with necessary generic hardware platform, but also by hardware, although the former will be preferred in most cases. Based on such an understanding, essential parts, or parts contributing to the prior art, of the technical solution of the present disclosure may be implemented in form of a software product. The computer software product is stored in a storage medium (e.g., an ROM/RAM, a magnetic disk and an optical disc) and includes several instructions used to be executed by a terminal (such as a handset, a computer, a server, an air conditioner or a network device) to perform the method according to the embodiments of the present disclosure.

The embodiments of the present disclosure are described above with reference to the accompanying drawings. However, the present disclosure is not limited to the foregoing specific implementations. The foregoing specific implementations are merely illustrative rather than limitative. In light of the teachings of the present disclosure, a person skilled in the art may further make various forms without departing from the spirit of the present disclosure and the scope of the claims, and these forms all fall within the scope of the present disclosure.

What is claimed is:

1. An indication method for a measurement result, operable by a terminal, comprising:

performing measurement in a non-connected state to obtain the measurement result;

transmitting an uplink message to a base station, the uplink message being at least used to indicate that the measurement result is valid; wherein the uplink message is an uplink message in a connection establishment procedure between the terminal and the base station, or the uplink message is an uplink message transmitted after the connection establishment procedure between the terminal and the base station is completed, wherein, after the transmitting the link message to the base station, the method further comprises:

in a case that a measurement result report indication transmitted by the base station is received, reporting to the base station a measurement result anions the measurement results that corresponds to the measurement result ort indication, wherein the measurement result report indication is used to indicate a reporting object, and the reporting object comprises at least one radio access technology.

2. The indication method according to claim 1, wherein the reporting to the base station the measurement result among the measurement results that corresponds to the measurement result report indication comprises:

reporting to the base station a measurement result of the reporting object that is comprised in the measurement results.

3. The indication method according to claim 2, wherein the reporting to the base station the measurement result of the reporting object that is comprised in the measurement results comprises:

in a case that the measurement results comprise the measurement result of the reporting object, reporting to the base station the measurement result of the reporting object.

4. The indication method according to claim 3, wherein the measurement result report indication is further used to indicate at least one of:

a radio access technology of at least one frequency, a radio access technology of at least one cell, a frequency of the at least one radio access technology, or a cell of the at least one radio access technology.

5. The indication method according to claim 2, wherein the reporting object comprises at least one of:

a frequency whose measurement result is top-N ranked, a cell whose measurement result is top-N ranked, a frequency whose measurement result is higher than a specific threshold, or a cell whose measurement result is higher than the specific threshold, wherein N is an integer greater than or equal to 1.

6. The indication method according to claim 5, wherein the frequency whose measurement result is top-N ranked comprises:

a frequency top-N ranked according to an average value for each frequency, wherein the average value for each frequency is an average value of measurement results of M cells on the frequency, the M cells are cells on the frequency whose measurement results are top-M ranked, and M is an integer greater than or equal to 1; or, a frequency top-N ranked according to a measurement result of a cell whose measurement result is the best for each frequency.

7. The indication method according to claim 1, wherein the uplink message is further used to indicate at least one of:

a frequency corresponding to the measurement result, a cell corresponding to the measurement result, a measurement value of the measurement result, or a radio access technology corresponding to the measurement result;

wherein the measurement value comprises at least one of:

a maximum value or a minimum value of the measurement results.

8. A terminal, comprising: a memory, a processor and a computer program stored in the memory and used to be executed by the processor, wherein the processor is used to execute the computer program to:

perform measurement in a non-connected state to obtain a measurement result;

transmit an uplink message to a base station, the uplink message being at least used to indicate that the measurement result is valid; wherein the uplink message is an uplink message in a connection establishment procedure between the terminal and the base station, or the uplink message is an uplink message transmitted after the connection establishment procedure between the terminal and the base station is completed, wherein the processor is further used to execute the computer program to: after transmitting the uplink message to the base station, in a case that a measurement result report indication transmitted by the station is received, report to the base station a measurement result among the measurement results that corresponds to the measurement result report indication, wherein the measurement result report indication is used to indicate a reporting oject, and the reporting Object comprises at least one radio access technology.

9. The terminal according to claim 8, wherein the processor is further used to execute the computer program to:

report to the base station a measurement result of the reporting object that is comprised in the measurement results.

10. The terminal according to claim 9, wherein the processor is further used to execute the computer program to:

in a case that the measurement results comprise the measurement result of the reporting object, report to the base station the measurement result of the reporting object.

11. The terminal according to claim 10, wherein the measurement result report indication is further used to indicate at least one of:

a radio access technology of the at least one frequency, a radio access technology of at least one cell, a frequency of the at least one radio access technology, or a cell of the at least one radio access technology.

12. The terminal according to claim 9, wherein the reporting object comprises at least one of:

a frequency whose measurement result is top-N ranked, a cell whose measurement result is top-N ranked, a frequency whose measurement result is higher than a specific threshold, or a cell whose measurement result is higher than the specific threshold, wherein N is an integer greater than or equal to 1.

13. The terminal according to claim 12, wherein the frequency whose measurement result is top-N ranked comprises:

a frequency top-N ranked according to an average value for each frequency, wherein the average value for each frequency is an average value of measurement results of M cells on the frequency, the M cells are cells on the frequency whose measurement results are top-M ranked, and M is an integer greater than or equal to 1; or, a frequency top-N ranked according to a measurement result of a cell whose measurement result is the best for each frequency.

14. The terminal according to claim 8, wherein the uplink message is further used to indicate at least one of:

a frequency corresponding to the measurement result, a cell corresponding to the measurement result, a measurement value of the measurement result, or a radio access technology corresponding to the measurement result;

wherein the measurement value comprises at least one of:

a maximum value or a minimum value of the measurement results.

15. A base station, comprising: a memory, a processor and a computer program stored in the memory and used to be executed by the processor, wherein the processor is used to execute the computer program to:

receive an uplink message transmitted by a terminal, the uplink message being at least used to indicate that a measurement result is valid; wherein the measurement result is obtained by the terminal by performing measurement in a non-connected state, the uplink message is an uplink message in a connection establishment procedure between the terminal and the base station, or the uplink message is an uplink message transmitted after the connection establishment procedure between the terminal and the base station is completed, the processor is further used to execute the computer program to: after receiving the uplink message transmitted by the terminal, transmit a measurement result report indication to the terminal;

receive a measurement result among the measurement results that is reported by the terminal and corresponds to the measurement result report indication, wherein the measurement result report indication is used to indicate a reporting object, and the reporting object comprises at least one radio access technology.

16. The base station according to claim 15, wherein the processor is further used to execute the computer program to:

receive a measurement result of the reporting object that is reported by the terminal and comprised in the measurement results.

17. The base station according to claim 16, wherein the processor is further used to execute the computer program to:

in a case that the measurement results comprise the measurement result of the reporting object, receive the measurement result of the reporting object reported by the terminal.

18. The indication method according to claim 3, wherein the reporting object further comprises at least one of: at least one frequency, or at least one cell.

19. The terminal according to claim 10, wherein the reporting object further comprises at least one of: at least one frequency, or at least one cell.

20. The base station according to claim 17, wherein the reporting object further comprises at least one of: at least one frequency, or at least one cell.

* * * * *